Aug. 21, 1962 D. W. MOORE 3,050,674
PHASE REGULATED INVERTERS
Filed Aug. 9, 1960 3 Sheets-Sheet 1
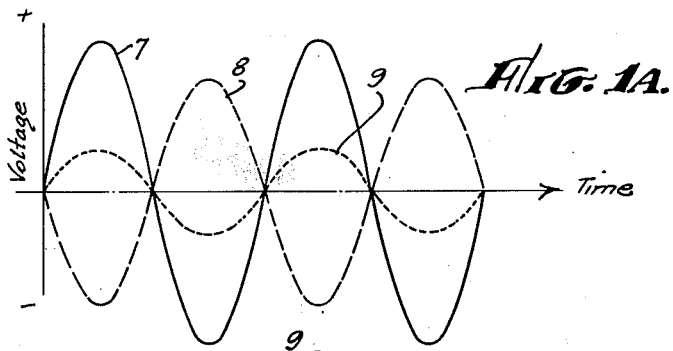
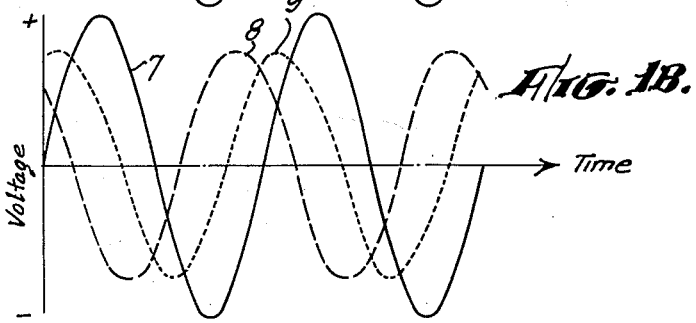
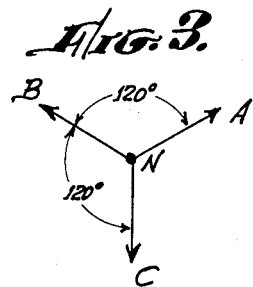
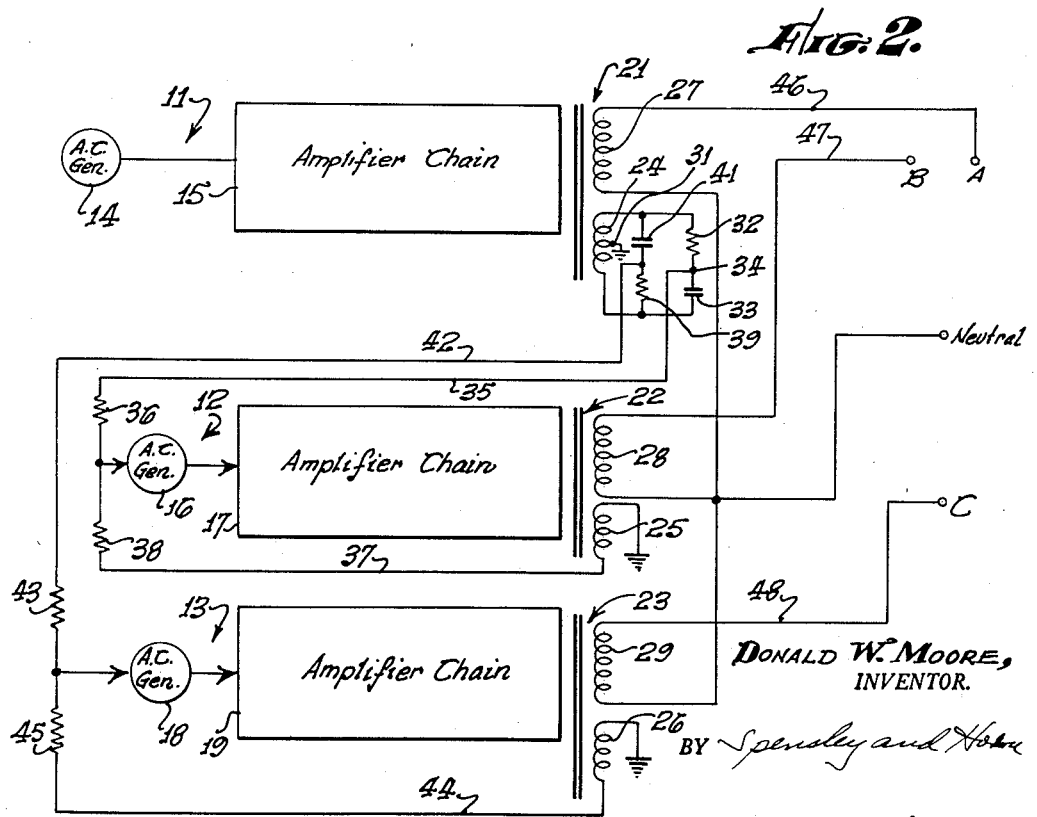
DONALD W. MOORE,
INVENTOR.
BY Spensley and Horn
ATTORNEYS.

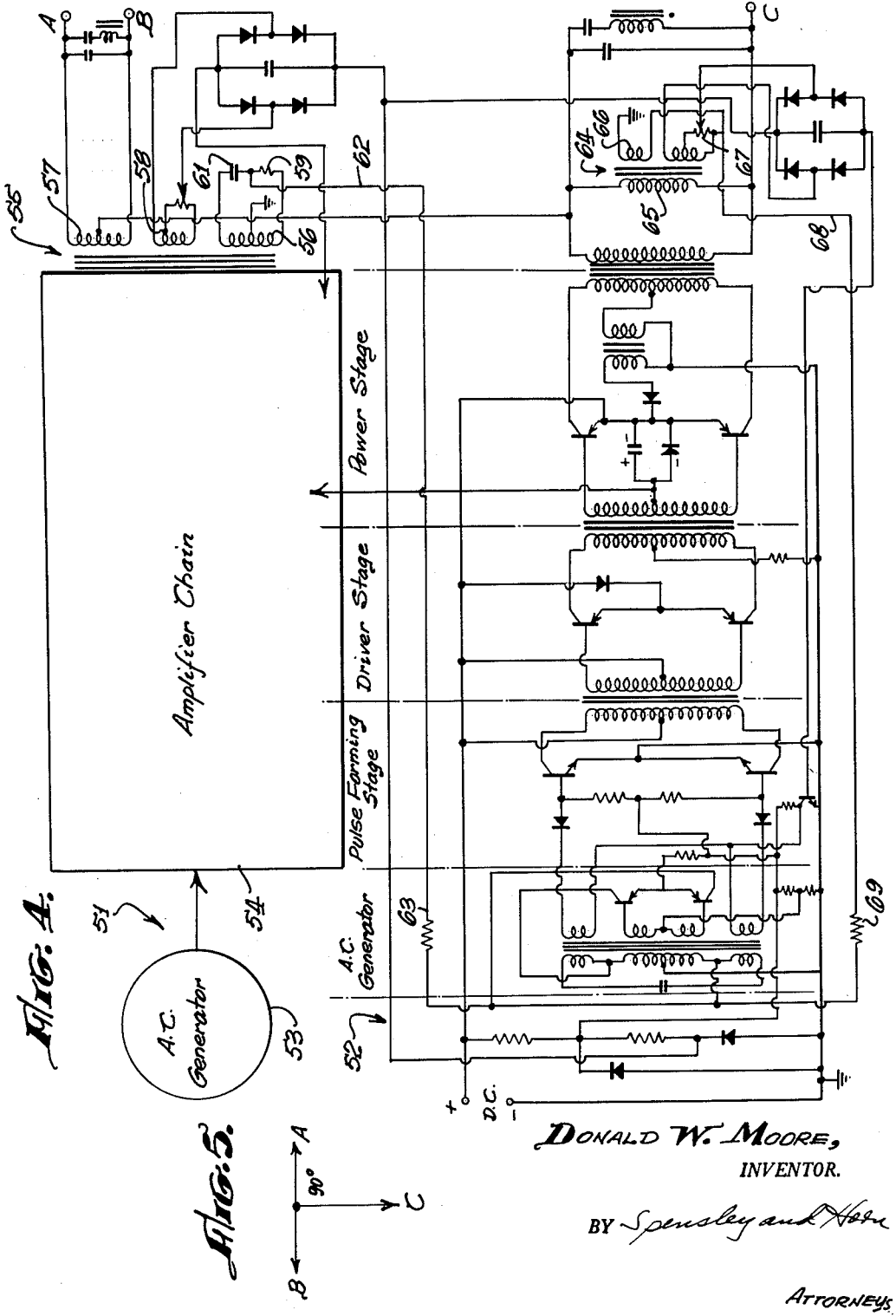

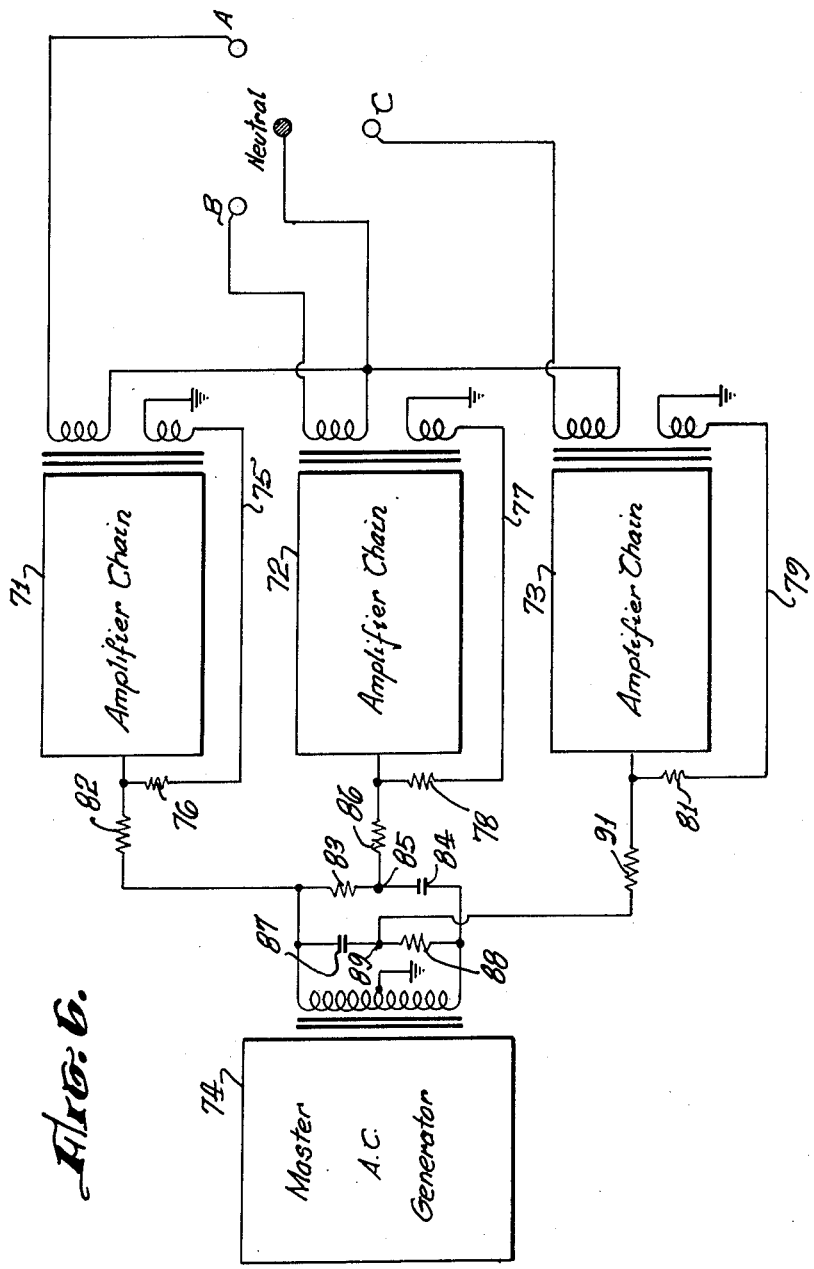

United States Patent Office 3,050,674
Patented Aug. 21, 1962

3,050,674
PHASE REGULATED INVERTERS
Donald W. Moore, Los Angeles, Calif., assignor to Electrosolids Corporation, Panorama City, Calif., a corporation of California
Filed Aug. 9, 1960, Ser. No. 48,500
13 Claims. (Cl. 321—5)

The present invention pertains to electronic devices for converting direct current electricity into polyphase alternating current electricity and more particularly to frequency and phase regulated static inverter systems.

Various devices have been developed to convert direct current electricity into polyphase alternating current electricity for relatively high power applications. Static inverter devices, i.e., those without an operational dependence on relative mechanical movement between component parts, usually achieve the desired high output capability by generating an A.C. signal, splitting the signal into a desired output phase relationship and separately amplifying the voltage of each phase. Adequate regulation of the frequency and magnitude of the output voltage of such devices can be readily accomplished and satisfactory operation into a fixed load at a fixed power factor can be obtained. However, at the present state of the art, there are no static inverter devices capable of providing adequate phase angle regulation to enable highly stable and efficient operation into a varying load and/or a changing power factor.

Static inverter devices of the aforementioned type ordinarily contain circuitry to maintain the separate outputs from the A.C. generator in fixed phase relationship to each other as they are fed into the amplifying stages. This type of phase regulation, however, does not automatically maintain the inverter output voltage in constant phase relationship upon load variations resulting in a load unbalance or a change in power factor, because such variations can alter the amount of phase shifting in the amplifier stages. Hence, even though the amplifier input signal voltages are maintained in the desired phase relationship there is no phase regulation of the inverter output voltage.

It is therefore an object of the present invention to provide improved static polyphase inverter systems.

It is another object of the present invention to provide improved frequency stabilized static polyphase inverter systems.

It is a further object of the present invention to provide static polyphase inverter systems having effective output phase regulation.

It is a still further object of the present invention to provide static polyphase inverter systems having both frequency and phase regulation.

It is a still further object of the present invention to provide static polyphase inverter systems having efficient output phase regulation in the presence of load variations causing load unbalances.

It is yet another object of the present invention to provide static polyphase inverter systems having efficient output phase regulation in the presence of load variations causing changes in power factor.

It is still another object of the present invention to provide static polyphase inverter systems having efficient output phase regulation in the presence of load variations causing load unbalance and changes in power factor.

Other objects and a fuller understanding of the invention can be had from the following description and claims, taken in conjunction with the accompanying drawing, in which:

FIGURES 1A and 1B graphically illustrate various voltage relationships developed during operation of the present invention by plotting voltage magnitude as a function of time;

FIGURE 2 shows a schematic diagram, partially in block form, of a three channel embodiment of the present invention to convert D.C. electricity into three-phase A.C. electricity;

FIGURE 3 vectorially depicts the output voltage relationships in the device of FIGURE 2;

FIGURE 4 shows a schematic diagram, partially in block form, of a two-channel embodiment of the present invention including transistorized circuitry suitable for use in an inverter channel;

FIGURE 5 vectorially depicts the output voltage relationships in the device of FIGURE 4; and, FIGURE 6 is a schematic diagram, partially in block form, of a master oscillator system embodiment of the present invention.

The objects of the present invention are accomplished, in the preferred embodiments, by providing a plurality of single-phase static inverter channels, the outputs of which are combined in a desired polyphase A.C. configuration. Each inverter channel consists of an A.C. generator and amplifier stage driven thereby, together with any waveshaping circuitry necessary to produce the desired sine wave voltage output. One channel is designated as the master channel and its output is sampled to provide reference voltages for synchronizing the operation of the A.C. voltage generator of each of the other channels. The phase of the reference voltage fed to each of the other channels differs from that of the master channel output voltage in accordance with the desired output phase relationship. Hence, the reference voltage fed to each channel provides two reference standards; a frequency reference and a phase reference. In addition, each of the other channels has a negative feedback loop which feeds a portion of the output back to the A.C. voltage generator for that channel to provide a phase feedback voltage. This phase feedback voltage combines with the reference voltage fed to that channel to form a resultant signal voltage of fixed frequency but of variable phase and amplitude. Therefore, the resultant signal voltage controls operation of the A.C. voltage generator to thereby maintain the output voltage of that channel in frequency and in phase with the applied reference voltage.

Thus, in normal operation and with a balanced load and unity power factor, the phase feedback voltage in each of the other channels will be 180° out of phase with the reference voltage applied to that channel. The resultant signal voltage will be exactly in phase with the applied reference voltage and will be of a magnitude equal to the difference between the magnitudes of the reference voltage and the phase feedback voltage. Relevant circuit parameters are selected so that, under the preceding specified conditions of operation, the magnitude of the resultant signal voltage approaches zero, the peak magnitude of the applied reference voltage being slightly greater than the peak magnitude of the applied phase feedback voltage. Hence, the A.C. generator of each of the other channels will be synchronized both in frequency and in phase with the applied reference voltage derived from the output of the master channel. This relationship is depicted graphically in FIGURE 1A of the accompanying drawing, wherein the reference voltage is shown by a solid line 7, the phase feedback voltage by a dashed line 8, and the resultant signal voltage by a dotted line 9.

During operation should there occur a sudden phase shift in the output voltage of a particular channel (other than the master channel) caused, for example, by a load unbalance or change in power factor, the phase feedback voltage of that particular channel will no longer be exactly 180° out of phase with the reference voltage applied to that channel. Therefore the resultant signal voltage applied to the A.C. generator of that channel, although still in frequency synchronization with the reference voltage, will have changed in phase and magnitude as shown in FIGURE 1B of the accompanying drawing.

Since the phase feedback voltage is a negative feedback voltage (with respect to the applied reference voltage) the phase shift of the resultant signal voltage will be in the opposite direction from the phase shift of the channel output voltage as can be seen from the relative positions of lines 7 and 8 in FIGURE 1B as compared with their respective positions in FIGURE 1A. A further study of FIGURES 1A and 1B will show that the magnitude of the resultant signal voltage will vary in accordance with the amount of relative phase shift. In the particular illustration of FIGURE 1B an approximate 45° phase lag in the phase feedback voltage, dashed line 8, is seen to have caused more than a 100 percent increase in the magnitude of the resultant signal voltage, dotted line 9, as well as an approximate 45° forward shift of the phase thereof. Hence, the resultant signal voltage changes in a compensating manner in response to phase changes in the channel output voltage to control operation of the A.C. voltage generator for that channel. This compensating change automatically brings the channel output voltage back into phase synchronization with the applied reference voltage and thereby provides the desired output phase regulation. The phase regulation achieved in this manner is particularly effective as, the greater the amount of phase shift in a channel output voltage, the greater is the magnitude of the corrective signal voltage applied to the A.C. generator of that channel.

If there should occur a sudden phase shift in the output voltage of the master channel, then the reference voltage applied to each of the other channels will accordingly be changed in phase. The phase feedback voltage for each channel will no longer be in exact 180° phase relationship with the reference voltage applied to that channel and the resultant signal voltage will change in a compensating manner as hereinbefore explained with respect to changes in phase feedback voltage. And, similarly, the outputs of each of the other channels will be then quickly brought into the desired phase relationship with the master channel output voltage to thereby provide the desired efficient output phase regulation.

Referring now to FIGURE 2 of the drawing, there is shown a preferred embodiment of the present invention to produce a three-phase Y output of alternating current electricity from a direct current input. The desired output phase relationship is achieved by proper combination of the outputs of three single-phase inverter channels generally indicated by the reference numerals 11, 12 and 13. Channel 11 consists of an A.C. voltage generator 14 driving an amplifier chain 15. Channel 11 forms the master channel, the output of which controls the operation of channels 12 and 13 in a manner to be hereinafter described. Channel 12 consists of an A.C. voltage generator 16 driving an amplifier chain 17, and channel 13 consists of an A.C. voltage generator 18 driving an amplifier chain 19. The A.C. voltage generators 14, 16 and 18 are substantially identical, as are the amplifier chains 15, 17 and 19. The A.C. voltage generators may produce a sine wave output or any symmetrically shaped A.C. voltage which can be shaped into a sine wave. The amplifier chains perform any necessary waveshaping, amplify the voltages to the desired magnitude and increase the power handling capabilities to the desired level. The direct current input is obtained from a source of D.C. electricity not shown, in the form of operating voltages for the inverter channels. Circuitry suitable for use in the inverter channels 11, 12 and 13 to convert direct current electricity to single-phase alternating current electricity is well known in the art and hence will not be discussed in detail. However, a presently preferred embodiment of transistorized circuitry is shown in FIGURE 4 of the accompanying drawing and will be discussed hereinafter.

The channels 11, 12 and 13 terminate in output transformers 21, 22 and 23, respectively, the primary windings of which are not shown. The transformers 21, 22 and 23 each have two secondary windings, designated as first output windings 24, 25 and 26, respectively, and second output windings 27, 28 and 29, respectively. The first output winding 24 of transformer 21 is center-tapped with the center tap 31 being connected to a point of common potential, i.e., ground.

Connected across the first output winding 24 of transformer 21 is a first series RC phase shifting network consisting of a resistor 32 and a capacitor 33 joined at a junction point 34. The orientation and the relative values of the resistor 32 and the capacitor 33 are selected so that an A.C. output voltage appearing between the junction 34 and ground will have a phase relationship of 120° with respect to an A.C. output voltage appearing across the second output winding 27. The junction 34 is connected to a frequency sensitive point in the circuitry of the A.C. generator 16 of channel 12 through an electrical lead 35 and a phase reference resistor 36, to thereby complete the circuitry for application of the aforementioned reference voltage to the A.C. voltage generator 16. One end of the first output winding 25 of the channel 12 output transformer 22 is also connected to the aforementioned frequency sensitive point in the circuitry of the A.C. generator 16 through an electrical lead 37 and a phase feedback resistor 38, the other end of the output winding 25 being grounded, to thereby complete the circuitry to provide the aforementioned phase feedback voltage.

Also connected across the first secondary winding 24 of the transformer 21 is a second series RC phase shifting network consisting of a resistor 39 and a capacitor 41. The orientation and relative values of the resistor 39 and the capacitor 41 are selected so that an A.C. output voltage appearing between their junction and ground will have a phase relationship of 240° with respect to an A.C. output voltage appearing across the second output winding 27 and a phase relationship of 120° with respect to the reference voltage appearing between the junction 34 and ground. The reference voltage is picked off from the junction between the resistor 39 and the capacitor 41 and fed to the A.C. generator 18 of channel 13 through a connecting lead 42 and a phase reference resistor 43.

One end of the first output winding 26 of the channel 13 output transformer 26 is connected to the A.C. generator 18 through an electrical lead 44 and a phase feedback resistor 45 to thereby complete the negative feedback loop for channel 13. The resistance values of the resistors 43 and 45 are identical with those of the resistors 36 and 38, respectively, and other pertinent circuit parameters are selected so that the reference voltage and the phase feedback voltage for channel 13 are of equal magnitude with those fed to channel 12 to thereby insure equal sensitivities and response times for all channels.

The relative magnitudes of the reference and phase feedback voltages are determined by the number of turns in the first output windings 24, 25 and 26 of the output transformers 21, 22 and 23, respectively. Correct relative phasing of these voltages is accomplished by connection to the proper ends of the first output windings of transformers 21 and 22, in accordance with the orientation of their respective windings with respect to the orientation of the first output winding 24 of transformer 21. The correct connections will result in negative feedback of the phase feedback voltage derived from the outputs of channels 12 and 13. The junctions of resistors 36 and 38 and resistors 43 and 45 are summation points at which the reference and phase feedback voltages combine to form the resultant signal voltages. In these summation circuits the resistors 36, 38, 43 and 45 provide isolation of the various voltage sources.

As previously explained, the resultant signal voltages applied to the A.C. generators 16 and 18 are at their minimum value under the operating conditions of a balanced load with unity power factor. Hence, the resistance values of the resistors 36, 38, 43 and 45, and the turns ratios of the output transformers 21, 22 and 23 are chosen so that under these operating conditions the peak magnitude of the reference voltage at each summation point will be slightly greater than the peak magnitude of the phase feedback voltage at that point. Only a relatively small voltage differential is necessary to provide a resultant signal voltage sufficient to lock-in the A.C. generators of the other channels under these ideal operating conditions.

The second output secondary windings 27, 28 and 29 of the output transformers 21, 22 and 23, respectively, are interconnected in the desired output phase relationship, a Y relationship in the illustrated embodiment. The output of the master channel 11 is connected to an output terminal A through an electrical lead 46, the output of channel 12 to an output terminal B through a lead 47, and the output of channel 13 to an output terminal C through a lead 48, the common Y connection is made from each of the output transformers to a terminal labelled "neutral." The voltage relationships between these output terminals is vectorially depicted in FIGURE 3.

Referring now to FIGURE 4, there is shown an adaptation of the present invention for an inverter system providing a Scott-T output phase relationship. For a Scott-T output only two inverter channels, indicated generally by the reference numerals 51 and 52, need be used. Channel 51 is the master channel and is shown in block form to consist of an A.C. voltage generator 53 and an amplifier chain 54, terminating in an output transformer 55. The output transformer 55, the primary winding of which is not shown, has three tapped secondary windings, a first output winding 56, a second output winding 57, and a third output winding 58.

The channel 52 is shown in schematic form and the illustrated circuitry is a presently preferred transistorized embodiment for all of the aforementioned inverter channels (channels 11, 12 and 13 in FIGURE 2 and channel 51 in FIGURE 4). The various stages of the circuit are indicated by vertical phantom lines and identified by captions appearing between the channels 51 and 52 which show the amplifier chain to consist of a "pulse forming stage," a "driver stage," and a "power stage." The A.C. generator is a push-pull sine wave oscillator, the output of which is fed to the pulse forming stage. The function of the pulse forming stage is to transform the sine wave input signal into a rectangular wave having a pulse repetition rate equal to the frequency of the applied sine wave signal, the duration of the rectangular pulses being varied in accordance with changes in the inverter load to thereby accomplish the desired regulation. The push-pull transistors of the pulse forming stage are driven into saturation to produce the desired rectangular waveshape, the pulse duration being equal to the period of conduction of the transistors. The period of conduction of the transistors is determined by variations in base bias, the base bias being obtained from a D.C. amplifier controlled by the inverter output voltage. Hence, the output from the pulse forming stage is a series of rectangular pulses that vary in time duration with load but remain fixed in amplitude and frequency.

The driver stage is a push-pull driver amplifier in which the transistors are driven hard into saturation during all of the conduction period, as determined by the output from the pulse forming stage. The power stage utilizes push-pull power transistors also driven to saturation, transistor current flow being steady during the conduction time. Sine wave output is achieved by tuning of the output transformer secondary and by proper filtering and attenuation of harmonics.

The output of the master channel 51 is sampled to provide a reference voltage for synchronizing the operation of the A.C. generator of the channel 52 in the manner hereinabove described during the discussion of the three-channel embodiment of FIGURE 2. A phase shifting network, consisting of a resistor 59 and a capacitor 61, is connected across the first output winding 56 of transformer 55. The orientation and the relative values of the resistor 59 and the capacitor 61 are selected so that an A.C. output voltage appearing between their junction and ground will have a phase relationship of 90° with respect to an A.C. output voltage appearing across the second output winding 57 of transformer 55. The reference voltage is picked off from the junction between the resistor 59 and the capacitor 61 and fed to the sine wave oscillator of channel 52 through a connecting lead and a phase reference resistor 63.

A negative feedback loop is provided around the channel 52 to provide the desired phase feedback voltage. The output of channel 52 is sampled by a separate transformer 64 having its primary winding 65 connected across the single secondary winding of the channel 52 output transformer. Transformer 64 has two secondary windings, a first secondary winding 66 and a second winding 67. The phase feedback voltage for channel 52 is obtained from the first secondary winding 66 and fed to the A.C. generator for that channel through a connecting lead 68 and a phase feedback resistor 69. The second secondary winding 67 of the transformer 63 samples the channel 52 output voltage for the D.C. amplifier which controls the conduction time of the transistors in the pulse forming stage of that channel. The third output winding 58 of the master channel output transformer 55 provides a sample of the master channel output voltage for the D.C. amplifier and pulse forming stage of the master channel.

The ends of the second output winding 57 of the master channel output transformer 55 are also connected to output terminals labelled "A" and "B." The center tap of the second output winding 57 is connected to one end of the single secondary winding of the channel 52 output transformer, the other end of the single secondary winding being connected to an output terminal labelled "C." The voltage relationships between these output terminals is vectorially depicted in FIGURE 5.

Utilizing the presently preferred embodiment of transistorized inverter channel circuitry shown in FIGURE 4 a phase regulation response time of about 0.1 second was obtained at an operating frequency of 400 cycles per second.

The preceding described embodiments of the present invention are presently preferred because of their high efficiency and extreme effectiveness of regulation. However, other embodiments may occur to those skilled in the art, as for example, an embodiment as shown in FIGURE 6. In such an embodiment, the advantages of the present invention are obtainable in a system, the efficiency and accuracy of regulation of which are not as great as in the preceding described embodiment. In FIGURE 6 the inverter channels consist only of amplifier chains 71, 72 and 73, all of the channels being driven by a single master A.C. generator 74. The output of the master A.C. generator provides the reference voltage, hence there is no "master" channel, all three channels functioning in an identical manner. Each channel (amplifier chain) is provided with a negative feedback loop to obtain the phase feedback voltage. The output of amplifier chain 71 is sampled and fed back to its input through a connecting lead 75 and a feedback resistor 76. The output of amplifier chain 72 is sampled and fed back to its input through a connecting lead 77 and a feedback resistor 78. And, in a similar manner, the output of amplifier chain 73 is sampled and fed back to its input through a connecting lead 79 and feedback resistor 81.

The output of the master A.C. generator 74 is fed to the input of the amplifier chain 71 through a phase reference resistor 82. The output of the master A.C. generator 74 is also sampled by an R–C phase shifting network comprising a resistor 83 and a capacitor 84, the orientation and relative values of which are selected so that an A.C. output voltage appearing between their junction 85 and ground will have a phase relationship of 120° with respect to the A.C. output voltage of the master A.C. generator 74. The reference voltage for channel 72 is picked off from the junction 85 between the resistor 83 and capacitor 84 and fed to the amplifier input through a phase reference resistor 86. Similarly, a second R–C phase shifting network consisting of a capacitor 87 and a resistor 88 is connected to sample the output of the master A.C. generator 74. The orientation and relative values of the capacitor 86 and the resistor 87 are selected so that an A.C. output voltage appearing between their junction 89 and ground will have a phase relationship of 240° with respect to the A.C. output voltage of master A.C. generator 74, and a phase relationship of 120° with respect to the reference voltage appearing between the junction 85 and ground. The reference voltage for amplifier chain 73 is picked off from the junction 89 and fed to the amplifier input through a phase reference resistor 91. Hence, the resultant signal voltages applied to the amplifier chain inputs are a combination of reference and phase feedback voltages. The resultant signal voltage varies in a compensating manner in response to phase changes in the channel output voltage to control operation of the respective amplifier chains to automatically maintain the channel output voltage in phase synchronization with the applied reference voltage.

Although the present invention has been described with a certain degree of particularity, it is understood that the present disclosure has been made only by way of example and that numerous changes in the circuitry and the combination and arrangement of parts may be resorted to without departing from the spirit and the scope of the invention as hereinafter claimed. For example, although only three phase output configurations have been illustrated, the present invention is adaptable for use with any desired polyphase configuration, the number of inverter channels required being determined by the number of phases and their relative displacements.

What is claimed is:

1. A multi-channel static inverter system for converting electricity from a direct current source into polyphase alternating current electricity of a predetermined output phase relationship comprising, in combination: a master single-phase inverter channel and at least one other single-phase inverter channel for connection to said D.C. source, each of said channels including a generator of an A.C. voltage of symmetrical waveshape and predetermined frequency, and each of said channels also including output coupling means; frequency and phase reference means interconnecting said output coupling means of said master channel with a frequency-sensitive point in the A.C. voltage generators of said other channels to provide a reference voltage to synchronize the A.C. voltage generators of said other channels at the frequency of the master channel output voltage, said reference means including means for determining the phase of the reference voltage applied to each of the A.C. voltage generators of said other channels in accordance with said predetermined output phase relationship with respect to the output from said master channel; negative feedback means interconnecting said output coupling means of each of said other channels with a frequency-sensitive point in the respective A.C. voltage generator for that channel to provide a phase feedback voltage to combine with the reference voltage applied to that A.C. voltage generator, the peak magnitude of said phase feedback voltage being less than the peak magnitude of the applied reference voltage, the combination of said phase feedback voltage with said reference voltage forming a resultant signal voltage of fixed frequency but of variable phase and amplitude to thereby control the operation of the A.C. voltage generator for each of said other channels to maintain the output voltage of that respective channel in frequency and in phase with the applied reference voltage; output terminals; and output phasing means interconnecting said output coupling means of said inverter channels with said output terminals in said predetermined output phase relationship.

2. A multi-channel static inverter system for converting electricity from a direct current source into polyphase alternating current electricity of a predetermined output phase relationship comprising, in combination: a master single-phase inverter channel and at least one other single-phase inverter channel for connection to said D.C. source, each of said channels including a generator of an A.C. voltage of symmetrical waveshape and predetermined frequency and each of said channels also including an output transformer with an output winding; frequency and phase reference means interconnecting said output winding of the master channel output transformer with a frequency-sensitive point in the A.C. voltage generators of said other channels to provide a reference voltage to synchronize the A.C. voltage generators of said other channels at the frequency of the master channel output voltage, said reference means including phase shifting means to determine the phase of the reference voltage applied to each of the A.C. voltage generators of said other channels in accordance with the predetermined output phase relationship with respect to the output from said master channel; negative feedback means interconnecting said output windings of the output transformers of each of said other channels with a frequency-sensitive point in the respective A.C. voltage generator for that channel to provide a phase feedback voltage to combine with the reference voltage applied to that A.C. voltage generator, the peak magnitude of said phase feedback voltage being less than the peak magnitude of the applied reference voltage, the combination of said phase feedback voltage with said reference voltage forming a resultant signal voltage of fixed frequency but of variable phase and amplitude to thereby control the operation of the A.C. voltage generator for each of said other channels to maintain the output voltage of that respective channel in frequency and in phase with the applied reference voltage; output terminals; and output phasing means interconnecting said output windings of the output transformers of said inverter channels with said output terminals in said predetermined output phase relationship.

3. A multi-channel static inverter system for converting electricity from a direct current source into three phase alternating current electricity of a Scott-T output phase relationship comprising, in combination: a master single-phase inverter channel and one other single-phase inverter channel for connection to said D.C. source, each of said channels including a generator of an A.C. voltage of symmetrical waveshape and predetermined frequency, and each of said channels also including an output transformer having an output winding; frequency and phase reference means interconnecting said output winding of the master channel output transformer with a frequency-sensitive point in the A.C. voltage generator of said other channel to provide a reference voltage to synchronize the A.C. voltage generator of said other channel at the frequency of the master channel output voltage, said reference means including phase shifting means to determine the phase of the reference voltage applied to the A.C. voltage generator of said other channel in accordance with the predetermined output phase relationship with respect to the output from said master channel; negative feedback means interconnecting said output winding of the output transformer of said other channel with a frequency-sensitive point in the respective A.C. voltage generator for that channel to provide a phase feedback voltage to combine with the reference voltage applied to that A.C. voltage generator, the peak magnitude of said phase feedback voltage being less than the peak magnitude of the applied reference voltage, the combination of said phase feedback voltage with said reference voltage forming a resultant signal voltage of fixed frequency but of variable phase and amplitude to thereby control the operation of the A.C. voltage generator for said other channel to maintain the output voltage of that respective channel in frequency and in phase with the applied reference voltage; output terminals; and output phasing means interconnecting said output coupling means of said inverter channels with said output terminals in said Scott-T output phase relationship.

4. A multi-channel static inverter system for converting electricity from a direct current source into three phase alternating current electricity of a Y output phase relationship comprising, in combination: a master single-phase inverter channel and two other single-phase inverter channels for connection to said D.C. source, each of said channels including a generator of an A.C. voltage of symmetrical waveshape and predetermined frequency, and each of said channels also including an output transformer having an output winding; frequency and phase reference means interconnecting said output winding of the master channel output transformer with a frequency-sensitive point in the A.C. voltage generators of said other channels to provide a reference voltage to synchronize the A.C. voltage generators of said other channels at the frequency of the master channel output voltage, said reference means including phase shifting means to determine the phase of the reference voltage applied to each of the A.C. voltage generators of said other channels in accordance with the predetermined output phase relationship with respect to the output from said master channel; negative feedback means interconnecting said output winding of the output transformer of said other channels with a frequency-sensitive point in the respective A.C. voltage generator for that channel to provide a phase feedback voltage to combine with the reference voltage applied to that A.C. voltage generator, the peak magnitude of said phase feedback voltage being less than the peak magnitude of the applied reference voltage, the combination of said phase feedback voltage with said reference voltage forming a resultant signal voltage of fixed frequency but of variable phase and amplitude to thereby control the operation of the A.C. voltage generator for each of said other channels to maintain the output voltage of that respective channel in frequency and in phase with the applied reference voltage; output terminals; and output phasing means interconnecting said output coupling means of said inverter channels with said output terminals in said Y output phase relationship.

5. A multi-channel static inverter system for converting electricity from a direct current source into polyphase alternating current electricity of a predetermined output phase relationship comprising, in combination: a master single-phase inverter channel and at least one other single-phase inverter channel for connection to said D.C. source, each of said channels including a generator of an A.C. voltage of symmetrical waveshape and predetermined frequency and each of said channels also including an output transformer having first and second output windings; frequency and phase reference means interconnecting the first output winding of said master channel output transformer with a frequency-sensitive point in the A.C. voltage generators of said other channels to provide a reference voltage to synchronize the A.C. voltage generators of said other channels at the frequency of the master channel output voltage, said reference means including phase shifting means to determine the phase of the reference voltage applied to each of the A.C. voltage generators of said other channels in accordance with the predetermined output phase relationship with respect to the output from said master channel; negative feedback means interconnecting the first output winding of the output transformer of each of said other channels with a frequency-sensitive point in the respective A.C. voltage generator for that channel to provide a phase feedback voltage to combine with the reference voltage applied to that A.C. voltage generator, the peak magnitude of said phase feedback voltage being less than the peak magnitude of the applied reference voltage, the combination of said phase feedback voltage with said reference voltage forming a resultant signal voltage of fixed frequency but of variable phase and amplitude to thereby control the operation of the A.C. voltage generator for each of said other channels to maintain the output voltage of that respective channel in frequency and in phase with the applied reference voltage; output terminals; and output phasing means interconnecting the second output windings of the output transformers of said inverter channels with said output terminals in said predetermined output phase relationship.

6. The device as defined in claim 5 wherein said phase shifting means included in said reference means is connected across the first output winding of the master channel output transformer with predetermined portions of said phase shifting means being separately connected through phase reference resistance means to the A.C. voltage generators of said other channels.

7. The device as defined in claim 5 wherein said negative feedback means includes feedback resistance means connecting the first output winding of the output transformer of each of said other channels with the respective A.C. voltage generator for that channel.

8. A multi-channel static inverter system for converting electricity from a direct current source into polyphase alternating current electricity of a predetermined output phase relationship comprising, in combination: a master single-phase inverter channel and at least one other single-phase inverter channel for connection to said D.C. source, each of said channels including a generator of an A.C. voltage of symmetrical wave shape and of a predetermined frequency and an output transformer having first and second output windings, the first output secondary winding of the master channel output transformer being center-tapped; frequency and phase reference means including connection of the center tap of the master channel output transformer first output winding and one end of the first output winding of the output transformer of each of the other channels to a point of common potential, the other end of said first output winding of the output transformer of each of said other channels being connected to a frequency-sensitive point in the respective A.C. voltage generator of that channel through negative feedback resistance means, and a series R-C phase shifting network for each of said other channels, each of said networks being connected across the first output winding of the master channel output transformer, the junction between the resistor and capacitor of the phase shifting network for each of said other channels being connected to a frequency-sensitive point in the A.C. voltage generator of that respective channel through phase reference resistance means, the relative values and positions of the resistor and capacitor in each phase shifting network being determined in accordance with said predetermined output phase relationship, the connections made to the first output winding of the output transformer for each of said other channels being phased in opposition to the connections made to the first output winding of the master channels output transformer; output terminals; and output phasing means interconnecting the second output windings of the output transformers of said inverter channels and said output terminals in said predetermined output phase relationship.

9. A multi-channel static inverter system for converting electricity from a direct current source into polyphase alternating current electricity of a predetermined output phase relationship comprising, in combination: a master A.C. generator for connection to said D.C. source to provide an A.C. reference voltage of symmetrical wave shape and predetermined frequency, said master A.C. generator having output coupling means; a plurality of single-phase converter channels, each of said channels including an amplifier chain for connection to said D.C. source, said amplifier chains having input coupling means and output coupling means; frequency and phase reference means interconnecting said master A.C. generator output coupling means with the input coupling means of each of said amplifier chains to thereby provide each of said amplifier chains with said A.C. reference voltage, said reference means including phase shifting means to determine the phase of the reference voltage applied to each of said amplifier chains in accordance with said predetermined output phase relationship; negative feedback means interconnecting the output coupling means of each of said amplifier chains with the input coupling means of that respective amplifier chain to provide a phase feedback voltage to combine with the reference voltage applied to that amplifier chain, the combination of said phase feedback voltage with said reference voltage forming a resultant signal voltage of fixed frequency but of variable phase and amplitude to thereby control the operation of the amplifier chain of each of said channels to maintain the output voltage of that respective channel in frequency and in phase with the applied reference voltage; output terminals; and, output phasing means interconnecting said output coupling means of said inverter channels with said output terminals in said predetermined output phase relationship.

10. A multi-channel static inverter system for converting electricity from a direct current source into three-phase alternating current electricity of the Scott-T output phase relationship comprising, in combination: a master A.C. generator for connection to said D.C. source to provide an A.C. reference voltage of symmetrical wave shape and predetermined frequency, said master A.C. generator having output coupling means; two single phase inverter channels, each of said channels including an amplifier chain for connection to said D.C. source, said amplifier chains having input coupling means and output coupling means; frequency and phase reference means interconnecting said master A.C. generator output coupling means with the input coupling means of each of said amplifier chains to provide each of said amplifier chains with said A.C. reference voltage, said reference means including phase shifting means to determine the phase of the reference voltage applied to each of said amplifier chains in accordance with said Scott-T output phase relationship; negative feedback means interconnecting the output coupling means of each of said amplifier chains with the input coupling means of that respective amplifier chain to provide a phase feedback voltage to combine with the reference voltage applied to that amplifier chain, the combination of said phase feedback voltage with said reference voltage forming a resultant signal voltage of fixed frequency but of variable phase and amplitude to thereby control the operation of the amplifier chain of each of said channels to maintain the output voltage of that respective channel in frequency and in phase with the applied reference voltage; output terminals; and, output phasing means interconnecting said output coupling means of said inverter channels with said output terminals in said Scott-T output phase relationship.

11. A multi-channel static inverter system for converting electricity from a direct current source into three-phase alternating current electricity of a Y output phase relationship comprising, in combination: a master A.C. generator for connection to said D.C. source to provide an A.C. reference voltage of symmetrical wave shape and predetermined frequency, said master A.C. generator having output coupling means; three single phase inverter channels, each of said channels including an amplifier chain for connection to said D.C. source, said amplifier chains having input coupling means and output coupling means; frequency and phase reference means interconnecting said master A.C. generator output coupling means with the input coupling means of each of said amplifier chains to provide each of said amplifier chains with said A.C. reference voltage, said reference means including phase shifting means to determine the phase of the reference voltage applied to each of said amplifier chains in accordance with said Y output phase relationship; negative feedback means interconnecting the output coupling means of each of said amplifier chains with the input coupling means of that respective amplifier chain to provide a phase feedback voltage to combine with the reference voltage applied to that amplifier chain, the combination of said phase feedback voltage with said reference voltage forming a resultant signal voltage of fixed frequency but of variable phase and amplitude to thereby control the operation of the amplifier chain of each of said channels to maintain the output voltage of that respective channel in frequency and in phase with the applied reference voltage; output terminals; and, output phasing means interconnecting said output coupling means of said inverter channels with said output terminals in said Y output phase relationship.

12. The device as defined in claim 9 wherein said phase shifting means included in said reference means is connected to the output coupling means of said A.C. master generator with predetermined portions of said phase shifting means being separately connected through phase reference resistance means to the input coupling means of said amplifier chains.

13. The device as defined in claim 9 wherein said negative feedback means includes feedback resistance means connecting the output coupling means of the amplifier chain of each of said channels with the respective input coupling means for that amplifier chain.

References Cited in the file of this patent

UNITED STATES PATENTS

| | | |
|---|---|---|
| 2,567,410 | Trousdale | Sept. 11, 1951 |
| 2,575,600 | Smith | Nov. 20, 1951 |
| 2,668,938 | Henrich | Feb. 9, 1954 |
| 2,827,576 | Wohlers | Mar. 18, 1958 |